Feb. 6, 1945.   T. F. DUIS   2,368,752
RECEPTACLE AND CARRIER
Filed Aug. 16, 1943   2 Sheets-Sheet 1
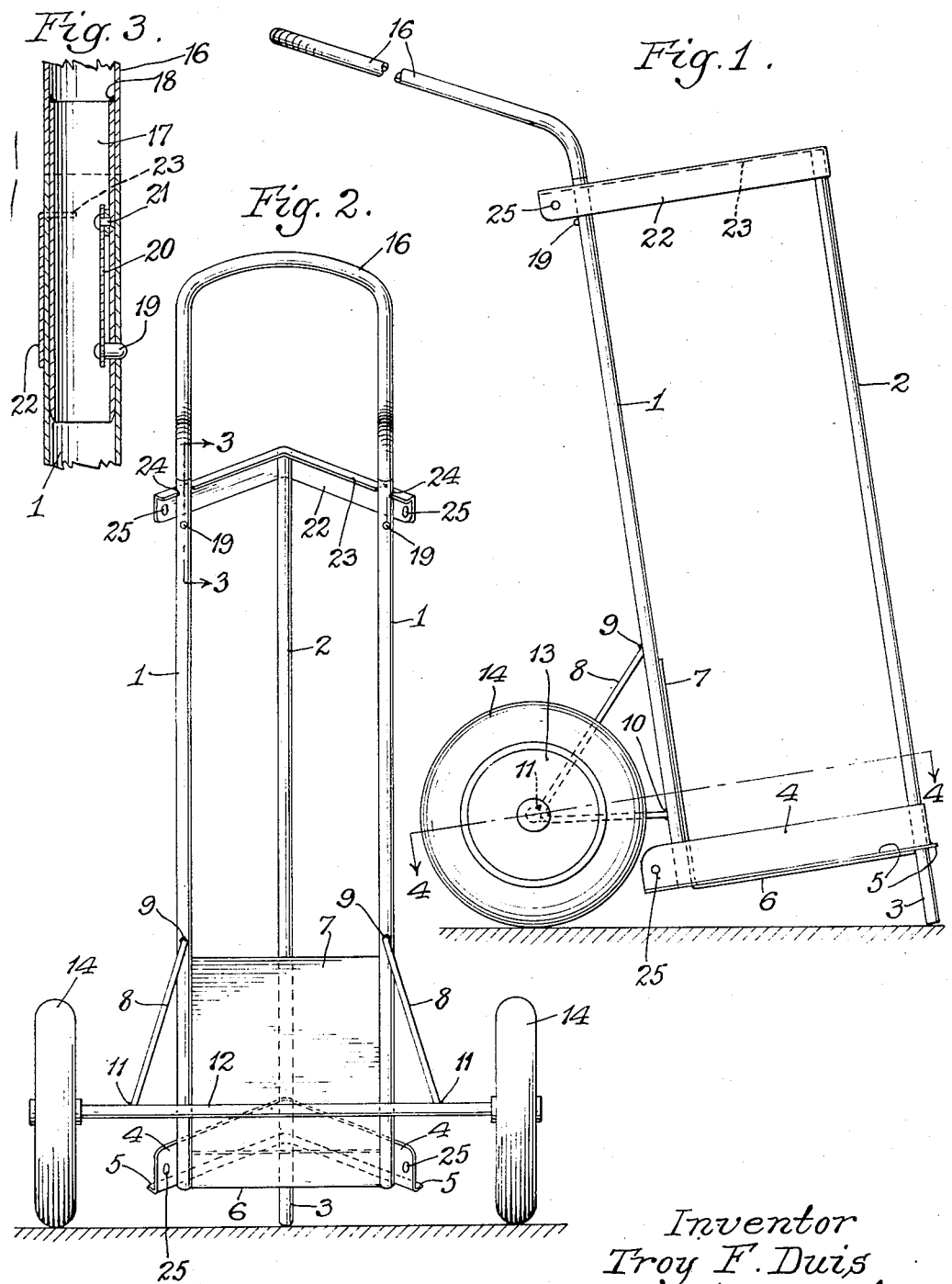
Inventor
Troy F. Duis
by Parker + Carter
Attorneys.

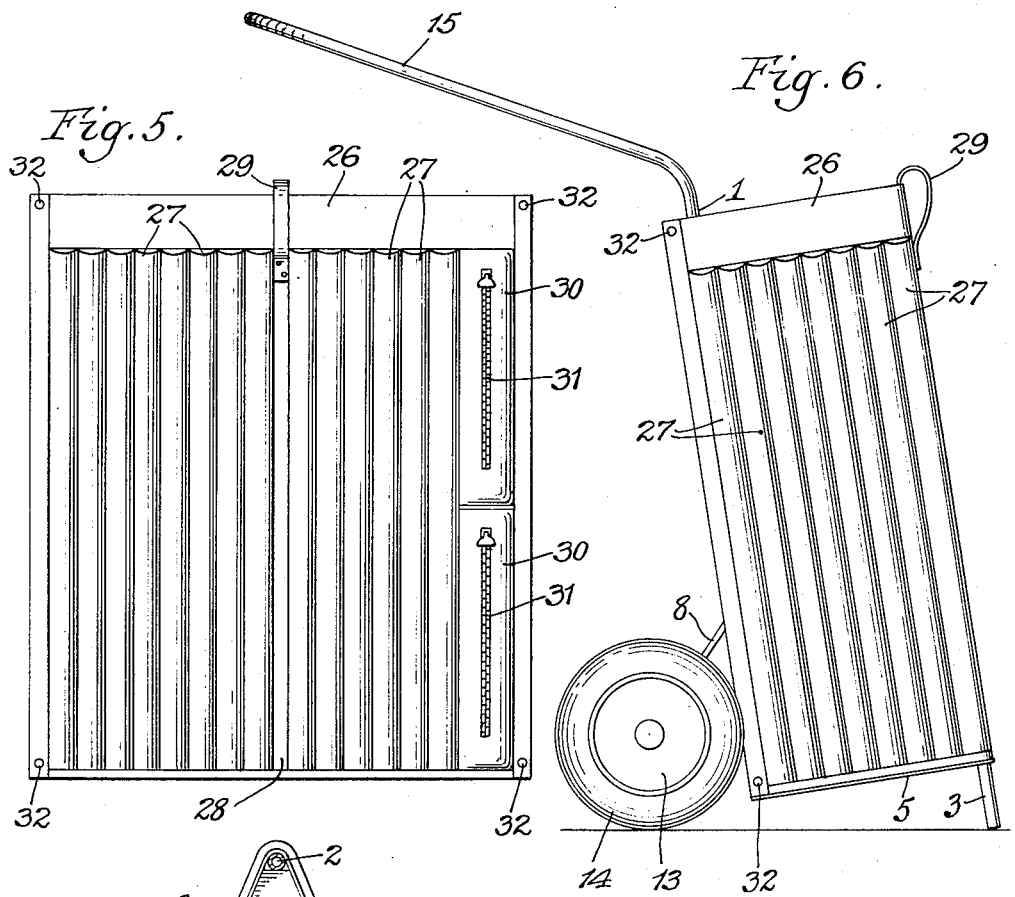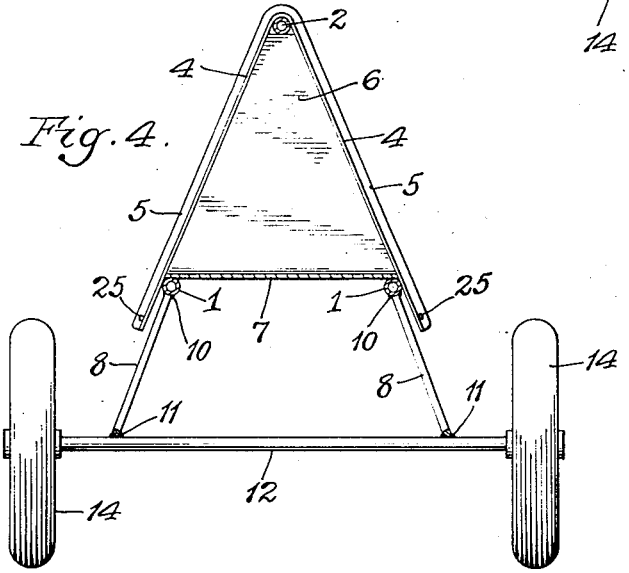

Patented Feb. 6, 1945

2,368,752

UNITED STATES PATENT OFFICE 2,368,752

RECEPTACLE AND CARRIER

Troy F. Duis, Streator, Ill.

Application August 16, 1943, Serial No. 498,855

8 Claims. (Cl. 280—51)

This invention relates to an apparatus for carrying golf clubs. It has for one object to provide a vehicle or truck for use in playing golf, and so arranged that a golf bag or other receptacle for golf clubs may be removably mounted upon it.

Another object is to provide a combined truck and golf bag so arranged that when the bag is mounted on the truck the bag is itself supported and in combination with the truck encloses a load-carrying space.

Other objects will appear from time to time throughout the specification and claims.

The invention is illustrated more or less diagrammatically in the accompanying drawings, wherein:

Figure 1 is a side elevation of one form of the truck without the bag;

Figure 2 is a rear view of the truck;

Figure 3 is a longitudinal sectional detail taken on an enlarged scale at line 3—3 of Figure 2;

Figure 4 is a transverse section of the truck taken at line 4—4 of Figure 1;

Figure 5 is a plan view of the golf bag in extended position; and

Figure 6 is a side elevation of the truck with the golf bag in position thereon.

Like parts are indicated by like characters throughout the specification and the drawings.

The truck may be formed of any material—wood, metal, plastics or synthetic material, or a combination of any of them. In the particular form here shown it is made of metal.

As shown, the truck comprises two rear frame members 1, 1 and a forward frame member 2. As shown, the forward member is longer than the rear members and has a downwardly extending end or portion 3. Secured to the three frame members and extending about them is a joining member having the two branches 4, 4. It is folded or bent about the front member 2 and extends rearwardly to and preferably beyond the rear frame members 1. It may be welded or otherwise secured to the frame members. The joining member may be provided with a flange 5 which extends preferably about it and is positioned on its outer side or surface. The flange, when present, serves as an additional support for the golf bag, as will be described below.

Secured adjacent the lower ends of the frame members 1 is a plate or bottom member 6. This member at its edges is preferably in contact with the joining member 4, which in a sense serves as a surrounding wall for the plate 6. Positioned upon and secured to the members 1 is a generally upwardly extending plate 7. This plate extends preferably to the bottom of the frame members 1, and at its bottom edge is in contact with the plate 6, and it thus forms a rear enclosure or closing member for the space otherwise enclosed by the joining member 4 and the bottom plate 6.

Extending rearwardly from each of the frame members 1 is an axle-supporting member 8. As shown particularly in Figures 1 and 6, these members are of generally triangular plan, and each of them may be welded or otherwise secured to one of the frame members 1, as at 9 and 10. The axle-supporting members 8 are secured, as at 11, to an axle 12, upon which wheels 13 are journaled. The wheels may be provided with rubber tires 14, if desired.

At their upper ends the frame members 1 may be joined. In other words, both members may be formed of a single section of pipe or rod which is bent to provide a loop so that the two frame members 1, 1 are parallel with each other. It may also be desirable to form the loop separably and removably. As shown in Figure 6, the members are continuous and they are bent to form a handle loop 15. As shown in Figures 1, 2 and 3, they are discontinuous, and the handle loop 16 is a separate or separable member. Figure 3 illustrates in detail the means for removably mounting the handle loop 16 upon the rear frames 1, 1. As shown, a tubular section 17 is secured to each end of the loops 16 by welding 18 or otherwise. The tubular member 17 is perforated to permit a latch 19 to extend through it, and the latch is mounted on a spring 20 which is biased to force the latch outwardly. The spring is secured to the tubular portion 17 by a support 21.

Each of the frame members 1 is perforated to permit the latch 19 to extend through it. The parts are so proportioned that when the tubular sections 17 are thrust one into each of the frame members 1, the latch 19 will be forced through the suitable opening or perforation in the corresponding frame member 1.

Positioned adjacent or upon the upper end of the forward frame member 2 is a second joining member 22. This member may have a lateral flange 23, if desired, and it is secured to both of the frame members 1 and to the frame member 2 and serves to hold them in place. The flange 23 may be notched, as at 24, 24, to embrace the frame members 1.

Since the frame is designed to receive and support a bag, it is preferably provided with members by means of which the bag may be removably engaged. The flange 5, when present, serves partially, at least, to support the bag, and each of the joining members 4 and 22 may be provided with snap fasteners 25, which are arranged to engage corresponding members on the bag.

Although a golf bag is illustrated and is shown in combination with the truck, it is to be understood that other forms of bags or containers may be substituted.

As shown, the golf bag comprises a main sheet-like member 26 which is provided with a plurality of pockets 27, 27. These pockets are preferably closed at their lower ends and open at their upper ends. The golf bag is arranged to fold over the truck and may be provided or shaped with a dividing portion 28. It may also have a handle 29, and it may be provided with additional pockets 30, 30, which have slide or other fasteners 31, 31. The bag is also preferably provided with snap fasteners 32, which are arranged to engage the snap fasteners 25 mounted upon the joining members of the truck. When it is desired to mount the bag on the truck, it is folded about the front sides of the truck, and the snap fasteners are engaged, the bottom of the bag preferably resting upon the flange 5 of the joining member 4. When thus mounted on the truck the bag is fully supported in an open position, and the contents of the bag are readily available. Golf clubs will ordinarily be positioned at both sides, in the pockets 27, and golf balls or other materials useful in playing the game will be positioned in the pockets 30. Because of the position of the golf bag upon and about the truck, its entire contents is held in a convenient position for use. The clubs are not bunched together as they would be in a conventional golf bag but are, in effect, "spread out" and separated so that they are readily available without confusion.

The golf bag in position on the truck serves as an enclosure for the two forward sides of the truck structure. They also cooperate with the rear plate 7, which is a partial enclosure for the rear of the truck. The bag and truck thus cooperate together to enclose a space within the truck which is not fully enclosed when the golf bag is absent. In this manner additional capacity is formed in the truck for carrying whatever articles the player may wish to carry.

When the truck is not in use, the golf bag may be detached from it and carried in any desired manner. It may be rolled up and held in rolled position by a strap or straps or otherwise, and the bag thus serves as a container for the clubs, whether it is mounted on the truck or not. Its shape, however, is such that it cooperates readily with the truck when secured to it, first, to form a ready support for the golf balls and other articles used in playing the game, and second, to form with the truck an enclosure for whatever other articles the user may wish to carry.

Although I have shown an operative form of my invention, it will be recognized that many changes in the form, shape, and arrangement of parts can be made without departing from the spirit of the invention, and my showing is, therefore, to be taken as, in a sense, diagrammatic.

I claim:

1. In combination in a truck, generally vertical frame members and transverse frame members joining them and forming with them an open sided truck body, a floor member closing the lower end of said truck, and an upwardly extending member partially closing one side of said truck, and a golf bag removably positioned about the unclosed sides of said truck, and forming with said upstanding member a complete enclosure for a substantial lower portion of said truck.

2. In combination in a truck, three generally vertical frame members and transverse frame members joining them and forming with them a truck body of triangular cross section, a floor member closing the lower end of said truck, and an upwardly extending member partially closing one side of said truck, and a golf bag removably positioned about the two unclosed sides of said truck, and forming an enclosure for the two sides of said truck.

3. In combination in a truck, frame members therefor, a floor plate closing the lower end of said truck, a load-carrying and frame-joining ledge-like member positioned adjacent said floor plate and about one side of said truck, and a second frame-joining member, a wheeled supporting means secured to said truck, and a golf bag removably positioned about a portion of said truck, removably secured to said truck and resting at its bottom end upon said flange.

4. In combination in a truck, three generally vertical frame members therefor, a floor plate closing the lower end of said truck, a load-carrying and frame-joining member positioned adjacent said floor plate and about two sides of said truck, said joining member being provided with an outwardly extending flange, and a second frame-joining member positioned above said first mentioned frame adjoining member, a wheeled supporting means secured to said truck, and a golf bag removably positioned about two sides of said truck, removably secured to said truck and resting at its bottom end upon said flange.

5. In combination in a truck, three frame members defining a triangular, open-sided truck body, means joining said frame members together, a member closing the bottom of the space defined by the said members, and means closing a portion of the side defined between two of said frame members, a support for said truck, and a load-carrying member, said load-carrying member adapted to be removably positioned about said frame, and when so positioned, to close the remaining sides of said frame.

6. In combination in a triangular truck, frame members defining an open-sided truck body, means joining said frame members together, a member closing the bottom of the space defined by the said members, and means closing a portion of the side defined between two of said frame members, a wheeled support for said truck, a removable handle therefor, and a removable load-carrying member including a base portion and a plurality of open-topped pockets, said load-carrying member adapted to be removably positioned about said frame, and when so positioned, to close the remaining two sides of said frame.

7. In combination, in a truck of generally triangular cross section, a support secured to said truck adjacent its lower end, three members defining an open-sided truck frame, a triangular floor member therefor, and an upstanding closure for one side of said frame, and a removable load-carrying member adapted to be secured upon and about said truck, and when so secured, to enclose two sides of said truck.

8. In combination, in a truck of generally triangular cross section, a wheeled support secured to said truck adjacent its lower end, a handle secured to said truck, members defining an open-sided truck frame, a floor member therefor, and an upstanding closure for a portion of said frame, and a removable load-carrying member adapted to be secured upon and about said truck, and when so secured, to enclose the remainder of said truck.

TROY F. DUIS.